United States Patent
Mawby et al.

(10) Patent No.: US 6,856,929 B1
(45) Date of Patent: Feb. 15, 2005

(54) TIRE MANUFACTURING METHOD FOR IMPROVING THE UNIFORMITY OF A TIRE

(75) Inventors: William David Mawby, Greenville, SC (US); George P. O'Brien, Piedmont, SC (US); Eugene Marshall Persyn, Anderson, SC (US); James Michael Traylor, Greer, SC (US)

(73) Assignee: 7 Michelin Recherche et Technique, Granges-Paccot (CH)

( * ) Notice: Subject to any disclaimer, the term of this patent is extended or adjusted under 35 U.S.C. 154(b) by 0 days.

(21) Appl. No.: 10/718,904

(22) Filed: Nov. 21, 2003

(51) Int. Cl.[7] .............................................. G06F 19/00
(52) U.S. Cl. ...................................................... 702/84
(58) Field of Search ............................. 702/35, 41, 72, 702/81, 84, 150, 151; 73/146; 152/209.1, 209.5; 156/117, 126, 127, 394.1; 425/17, 28.1, 38

(56) References Cited

U.S. PATENT DOCUMENTS

| | | | |
|---|---|---|---|
| 5,060,510 A | 10/1991 | Rousseau | |
| 5,365,781 A | 11/1994 | Rhyne | |
| 5,882,452 A | 3/1999 | Sakamoto et al. | |
| 6,257,956 B1 | 7/2001 | Shteinhauz et al. | |
| 6,286,195 B1 * | 9/2001 | Takahashi | 29/407.1 |
| 6,514,441 B1 | 2/2003 | Tanaka et al. | |
| 2003/0205080 A1 | 11/2003 | Shteinhauz et al. | |

FOREIGN PATENT DOCUMENTS

| | | |
|---|---|---|
| JP | 1-145135 | 6/1989 |
| JP | 4-193528 | 7/1992 |
| JP | 6-182903 | 7/1994 |
| JP | P2002-103332 A | 4/2002 |

* cited by examiner

Primary Examiner—Michael Nghiem
(74) Attorney, Agent, or Firm—E. Martin Remick; Alan Csontos (57) ABSTRACT

A tire manufacturing method includes a method for optimizing the uniformity of a tire by reducing the after cure radial force variation. The after cure radial force variation vector is modeled as a vector sum of each presenting contributions arising from the tire building steps—the "tire room effect vector" and a vector representing contributions arising from the vulcanization and uniformity measurement steps—the "curing room effect vector." In further detail, both the tire room and curing room effect vectors can be further decomposed into sub-vectors representing each radial force variation contribution for which a measurable indicator is available. For a series of tires, the method obtains such measurements as the before cure radial runout (RRO) at one or more stages of the building sequence, measurements of loading angles on the tire building equipment, and measurements made during vulcanization process.

17 Claims, 5 Drawing Sheets

TIRE MANUFACTURING METHOD FOR IMPROVING THE UNIFORMITY OF A TIRE

BACKGROUND OF THE INVENTION

The present invention relates to a manufacturing method for tires, more specifically a method for improving the uniformity of a tire by reducing the after cure radial force variation. In a tire, and more precisely, a radial tire, the after cure radial force variation (RFV) can be affected by many variables introduced from the process of assembly of the green (uncured) tire and during curing of the tire. When the radial force variation in a cured tire exceeds acceptable limits, the result may be unwanted vibrations affecting the ride and handling of the vehicle. For these reasons, tire manufacturers strive to minimize the level of radial force variation in the tires delivered to their customers.

A well-known and commonly practiced method to improve the after cure RFV is to grind the tread surface of the tire in the zones corresponding to excess radial force. This method is effective, but has the drawback of creating an undesirable surface appearance and of removing wearable tread rubber from the product. In addition, this method requires an extra manufacturing step and uses expensive equipment. Alternatively, the after cure RFV may be improved by the method described in U.S. Pat. No. 5,365,781 where the sidewalls of the cured tire are physically deformed in a controlled manner in response to a measured uniformity characteristic. This method eliminates the undesirable removal of tread rubber, but still requires an extra manufacturing step and high-cost equipment.

An alternative to after cure correction of RFV is to treat the sources of RFV in the tire before cure. For example, it is well known in the tire industry to stagger the starting points of the various tire products during the assembly process, followed by observing the effect on after cure RFV. These data are then used to specify an optimum arrangement of product start points for each of the tire building steps according to the configuration that best minimizes after cure RFV. Another approach is disclosed in U.S. Pat. No. 5,882,452 where the before cure radial runout (RRO) of the tire is measured, followed by a process of clamping and reshaping the uncured tire to a more circular form.

Still another approach to a manufacturing method for improved uniformity involves a method where the factors relating to tire building and tire curing that contribute to after cure RRO or RFV are offset relative to a measured before cure RRO. An example of a typical method is given in Japanese Patent Application JP-1-145135. In these methods a sample group of tires, usually four, are placed in a given curing mold with each tire rotated an equal angular increment. The angular increment is measured between a reference location on the tire, such as a product joint, relative to a fixed location on the curing mold. Next, the tires are vulcanized and their composite RFV waveforms recorded. The term "composite waveform" means the raw waveform as recorded from the measuring device. The waveforms are then averaged by superposition of each of the recorded waveforms upon the others. Superposition is a point by point averaging of the recorded waveforms accomplished by overlaying the measured composite waveform from each tire. The effects of the vulcanization are assumed to cancel, leaving only a "formation" factor related to the building of the tire. In like manner, another set of sample tires is vulcanized in a curing mold and their respective RFV waveforms are obtained. The respective waveforms are again averaged by superposition, this time with the staring points of the waveforms offset by the respective angular increments for each tire. In this manner, the effects of tire building are assumed to cancel, leaving only a "vulcanization factor." Finally, the average waveforms corresponding to the formation factor and the vulcanization factor are superimposed. The superimposed waveforms are offset relative to each other in an attempt to align the respective maximum of one waveform with the minimum of the other waveform. The angular offset thus determined is then transposed to the curing mold. When uncured tires arrive at the mold, each tire is then placed in the mold at the predetermined offset angle. In this manner, the formation and vulcanization contributions to after cure RFV are said to be minimized. A major drawback to this method is its assumption that the formation and vulcanization contributions to after cure RFV are equivalent for each tire. In particular, the factors contributing to the formation factor can vary considerably during a manufacturing run. In fact, these methods contain contradictory assumptions. The methodology used to determine the vulcanization factor relies on an assumption that the step of rotation of the tires in the curing mold cancels the tire building (or formation) effects. This assumption is valid only when the contribution of before cure RRO is consistent from one tire to the next tire, without random contributions. If this assumption is true, then the subsequent method for determination of the formation factor will produce a trivial result.

Further improvements have been proposed in Japanese Patent Application JP-6-182903 and in U.S. Pat. No. 6,514,441. In these references, methods similar to those discussed above are used to determine formation and vulcanization factor waveforms. However, these methods add to these factors an approximate contribution of the before cure RRO to the after cure RFV. The two methods treat the measured before cure RRO somewhat differently. In the method disclosed in reference JP-6-198203 optimizes RRO effects whereas the method disclosed in U.S. Pat. No. 6,514,441 estimates RFV effects by application of a constant stiffness scaling factor to the RRO waveform to estimate an effective RFV. Both these methods continue to rely on the previously described process of overlapping or superpositioning of the respective waveforms in an attempt to optimize after cure RFV.

The most important shortcoming of all the above methods is their reliance of superpositioning or overlapping of the respective waveforms. It is well known in the tire industry that the vehicle response to non-uniformity of RFV is more significant in the lower order harmonics, for example harmonics one through five. Since, the above methods use composite waveforms including all harmonics, these methods fail to optimize the RFV harmonics to which the vehicle is most sensitive. In addition, a method that attempts to optimize uniformity using the composite waveforms can be shown, in some instances, to produce after-cure RFV that actually increases the contribution of the important lower order harmonics. In this instance, the tire can cause more vehicle vibration problems than if the process were not optimized at all. Therefore, a manufacturing method that can optimize specific harmonics and that is free of the aforementioned assumptions for determining the effects of tire formation and tire vulcanization would be capable of producing tires of consistently improved uniformity.

SUMMARY OF THE INVENTION

In view of the above background, the present invention provides a tire manufacturing method that can effectively reduce the after cure radial force variation (RFV) of each tire produced. The method of the present invention operates to independently optimize each harmonic of RFV. A composite RFV signal, such as those described above, is a scalar quantity that is the variation of the tire's radial force at each angular position around the tire from the average radial force corresponding to the vertical load applied to the tire. When this composite is decomposed into its respective harmonic components, each harmonic of RFV can be expressed in polar coordinates as an after cure RFV vector. This vector has a magnitude equal to the peak-to-peak magnitude of the force variation of the respective harmonic and an azimuth equal to the angular difference between the measuring reference point and the point of maximum RFV.

The method of the present invention provides a significant improvement over previous methods by employing a vectorial representation of the several factors that contribute to the measured after cure RFV for a tire produced by a given process. The after cure RFV vector is modeled as a vector sum of each of the vectors representing RFV contributions arising from the tire building steps—the "tire room effect vector" and a vector representing RFV contributions arising from the vulcanization and uniformity measurement steps—the "curing room effect vector." In further detail, both the tire room and curing room vectors can be further decomposed into sub-vectors representing each RFV contribution for which a measurable indicator is available. For a series of tires, the method obtains such measurements as the before cure radial runout (RRO) at one or more stages of the building sequence, measurements of loading angles on the tire building equipment, and measurements made during vulcanization process. After vulcanization, the tires are mounted on a uniformity measurement machine and the measured after cure RFV harmonic components are obtained. At this point, none of the coefficients for the magnitude and azimuth of the sub-vector components is known.

The present invention further improves on previously described methods since it does not rely on manipulation of the measured, composite RFV waveforms to estimate the tire room and curing room effects and does not rely on any of the previously described assumptions. The present invention uses the aforementioned measured data as input to a single analysis step. Thus, the coefficients of all the sub-vectors are simultaneously determined. Once these coefficients are known, the tire room effect vector and curing room effect vector are easily calculated. The method of the invention accounts for the possible RRO of the building drum itself. When any of the previously described methods measure the RRO of a green tire, the measured RRO is the sum of the actual green tire RRO and the RRO of the measuring device upon which the tire is currently mounted, be it a building drum or a measurement apparatus. In summary, the first step of the method determines a set of vector coefficients corresponding to the after cure radial force variation of a tire and comprises the steps of:

(a) recording a loading angle of a tire carcass on a measurement fixture, (b) measuring the before cure radial runout of a plurality of finished tires, (c) recording a loading angle of said finished tires in a curing mold and curing said tires, (d) measuring the after cure radial force variation for each of said tires, (e) extracting at least one harmonic of radial runout and of the radial force variation of said tires, (f) determining a set of vector coefficients relating the before cure radial runout to the after cure radial force variation of said tires cured in said mold, (g) storing said vector coefficients, Thereafter, as the individual tires are manufactured, the before cure RRO and other manufacturing data are measured and recorded. These data are then input to the vector model and the magnitude and azimuth of the tire room vector are calculated. Next, a second step requires estimating the after cure uniformity of an individual tire comprising the sub-steps of:

(h) recording a loading angle of a carcass of said individual tire on said measurement fixture, (i) measuring the before cure radial runout of said individual tire, (j) choosing a harmonic of radial force variation to be optimized, (k) extracting a harmonic of before cure radial runout of said individual tire, (l) estimating a tire room effect vector of the radial force variation corresponding to said harmonic, (m) estimating a curing room effect vector of the radial force variation corresponding to said harmonic, (n)

Finally, the estimated tire room and curing room effect vectors are used to calculate the angular orientation of the uncured tire in the curing mold that will minimize after cure RFV for that individual tire. The step of optimizing the after cure uniformity of an individual tire comprises the sub-steps of:

(a) Determining an azimuth of said tire room effect vector and of said curing-room effect vector, (b) Aligning the angular position of said individual tire in said curing mold such that said azimuth of said tire room effect vector opposes said curing room effect vector, and (c) Placing said individual tire so aligned in said curing mold and curing said tire.

The method of the invention just described further improves on previous methods in its treatment of the factors that relate before cure RRO to after cure RFV. It has been found that RRO variations on the before cure tire do not always produce an after cure RFV contribution that is a scalar multiple of the RRO vector either in magnitude or azimuth. Thus, a scalar representation that relies on a simple stiffness factor can lead to erroneous result. In the present invention method, the contribution to after cure RFV is modeled as the vector product of a gain vector and the RRO vector. The gain vector correctly models the transformation from before cure RRO to after cure RFV. At least one pair of vector coefficients corresponds to the gain vector.

The method of the invention has an additional advantage owing to its simultaneous determination of the sub-vectors. Unlike previous methods, the method of the invention does not require any precise angular increments of the loading positions to determine the sub-vectors. This opens the possibility to continuously update the sub-vector coefficients using the measured data obtained during the production runs. Thus, the method will take into account production variables that arise during a high volume production run.

BRIEF DESCRIPTION OF THE DRAWINGS

The invention will be better understood by means of the drawing accompanying the description, illustrating a non-limitative example of the execution of the tire manufacturing method for improving the uniformity of a tire according to the invention.

DETAILED DESCRIPTION

Reference will now be made in detail to exemplary versions of the invention, one or more versions of which are illustrated in the drawings. Each described example is provided as an explanation of the invention, and not meant as a limitation of the invention. Throughout the description, features illustrated or described as part of one version may be usable with another version. Features that are common to all or some versions are described using similar reference numerals as further depicted in the figures.

Modern pneumatic tires are generally manufactured with great care and precision. The tire designer's goal is that the finished tire is free of non-uniformity in either the circumferential or lateral directions. However, the designer's good intentions notwithstanding, the multitude of steps in the tire manufacturing process can introduce a variety of non-uniformities. An obvious non-uniformity is that the tire may not be perfectly circular (radial runout or RRO). Another form of non-uniformity is radial force variation (RFV). Consider a tire mounted on a freely rotating hub that has been deflected a given distance and rolls on a flat surface. A certain radial force reacting on the flat surface that is a function of the design of the tire can be measured by a variety of known means. This radial force is, on average, equal to the applied load on the tire. However, as the tire rolls, that radial force will vary slightly due to variations in the internal tire geometry that lead to variations in the local radial stiffness of the tire. These variations may be caused on the green tire by localized conditions such as product joints used in the manufacture of the green tire, inaccurate placement of certain products. The process of curing the tire may introduce additional factors due to the curing presses or slippage of products during curing.

Figure 1:
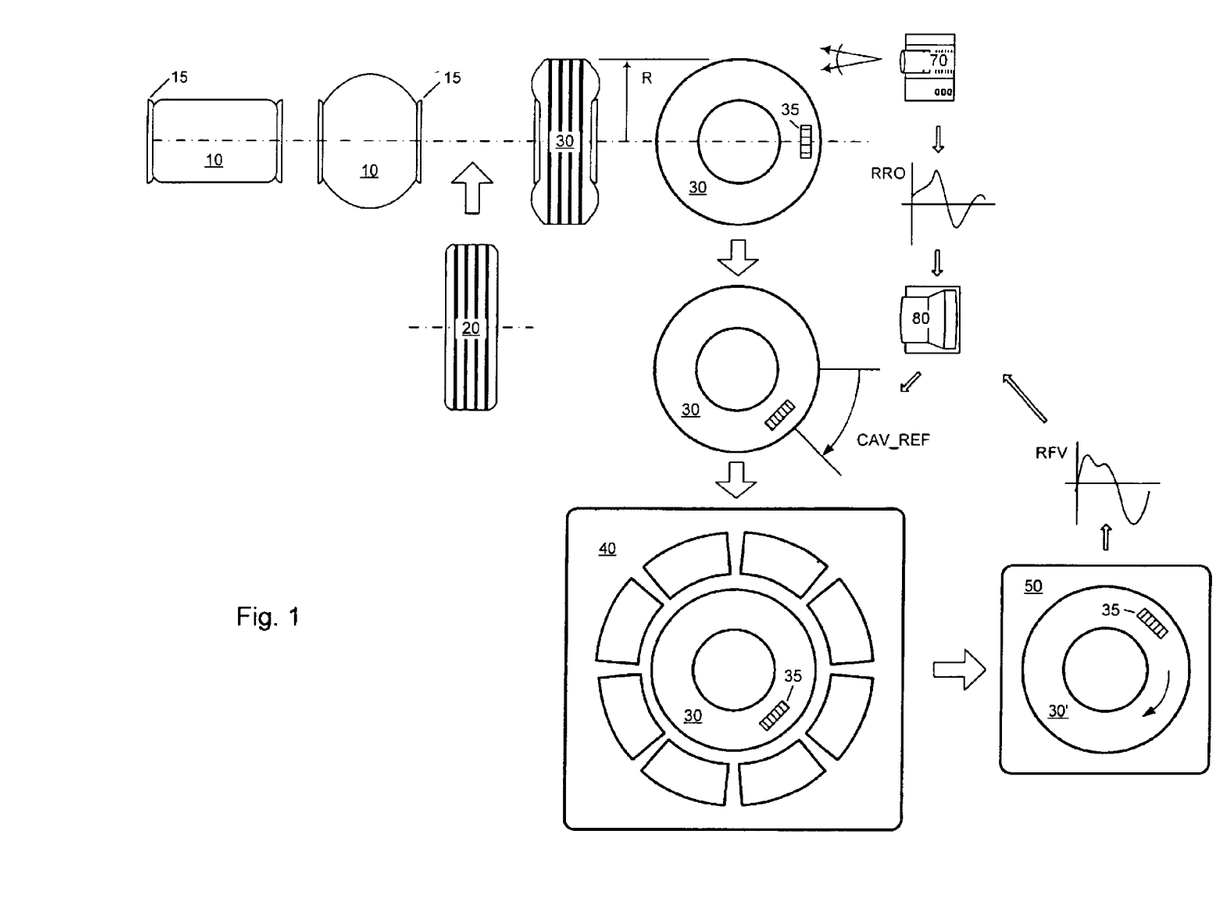
FIG. 1 is a schematic representation of a tire manufacturing process equipped to practice the method of the invention.

FIG. 1 depicts is a simplified depiction of the tire manufacturing process. A tire carcass 10 is formed on a building drum 15. In a unistage manufacturing process, the carcass 10 remains on the drum 15. In a two-stage process, the carcass 10 would be removed from the drum 15 and moved to a second stage finishing drum. In either case, the carcass 10 is inflated to receive a finished tread band 20 to produce the finished green tire 30. In one variation of the invention, the RRO of the green tire 30 is measured by a measurement system 70 using a barcode 35 as a reference point. The RRO waveform is stored, here in a computer 80. The green tire 30 is moved to the curing room where the orientation angle of the tire CAV_REF is recorded. The tire is then loaded into a curing cavity 40 and cured. The cured tire 30' is moved to a uniformity measurement machine 50 for measurement and recording of the tire RFV.

Figure 2A:
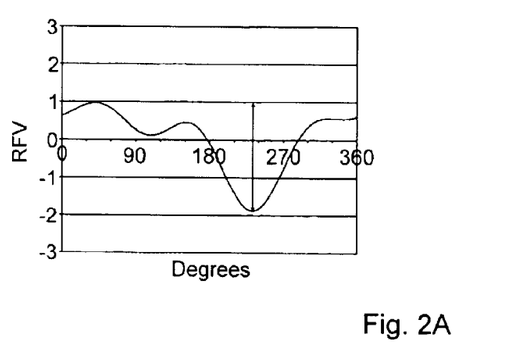
FIG. 2A-FIG. 2C depicts schematic representations of a uniformity measurement of the radial force variation of tire showing the original composite waveform as well as several harmonic components.
Figure 2B:
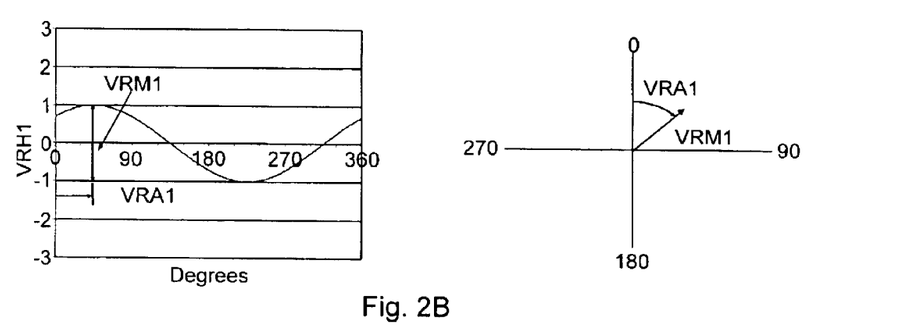
Figure 2C:
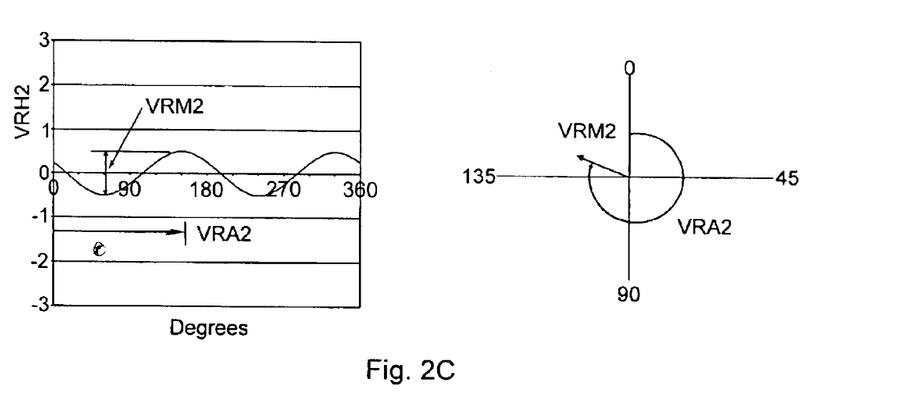

FIG. 2A shows a schematic of the measured RFV for a cured tire 30'. The abscissa represents the circumference of the tire and the ordinate the radial force variations. FIG. 2A is the as-measured signal and is referred to as a composite waveform. The composite waveform may comprise an infinite series of harmonics. The individual harmonics may be obtained by applying Fourier decomposition to the composite signal. FIGS. 2B and 2C depict the resulting first and second harmonics, respectively, extracted form the composite signal. The magnitude of the first harmonic of radial force VRM1 is defined as the difference between the maximum and minimum force. The phase angle or azimuth of the first harmonic VRA1 is defined as the angular offset between the reference location for the measurement and the location of maximum radial force. Thus, the sine wave depicted by Cartesian coordinates in FIG. 2B can be equally shown as a vector in a polar coordinate scheme. Such a vector polar plot is shown in FIG. 2C immediately to the right of the sine wave plot. The RFV vector of the first harmonic VRH1 has a length equal to VRM1 and is rotated to an angle equal to the azimuth VRA1. In a similar manner, one can extract the second harmonic vector VRH2 shown in FIG. 1C that has a force magnitude VRM2 and an azimuth VRA2. The corresponding polar plot for the H2 vector resembles the H1 vector, except that the angular coordinate is now two times the azimuth angle.

In the description of an example of the method that follows, the particular example is confined to the optimization of the first harmonic H1. However, it is within the scope of the present invention to apply the method to optimize a different harmonic such as H2, H3, etc. Likewise, the following example describes the optimization of radial force variation, whereas it is within the scope of the invention to apply the method to the correction of other uniformity characteristics such as cured tire radial runout or lateral force variation. In brief, the method may be used to optimize the harmonics of any measurable uniformity characteristic with suitable modifications to the vector equations described below.

Figure 3:
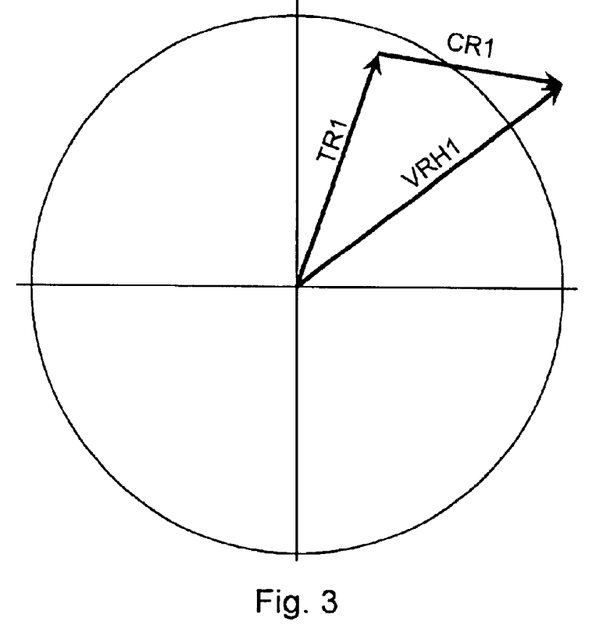
FIG. 3 is a vector polar plot of the method of the invention showing the contributions of the tire room and curing room vectors to the after cure radial force variation of a tire.

FIG. 3 is a vector polar plot showing the two major contributions to first harmonic of the after cure radial force variation, the tire room effects vector TR1, and the curing room effects vector CR1 when no optimization has been applied. The cured tire result VRH1 is the vector sum of these two components. A unique attribute of the invention is the ability to optimize the after cure uniformity by manipulation of these two component vectors. The ability to treat these effects in vector space is possible only when each harmonic has been extracted.

Figure 4:
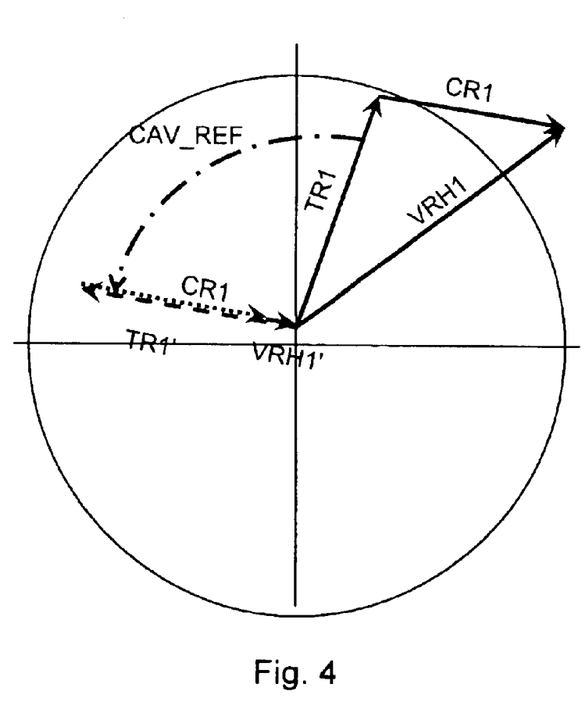
FIG. 4 is a vector polar plot of the method of the invention demonstrating the optimization of cured tire uniformity.

FIG. 4 now shows a schematic of the optimization step. In this view the green tire 30 has been physically rotated by a pre-determined angle CAV_REF so that its tire room effect vector (TR1) now directly opposes the curing room effect vector CR1, the latter being fixed if there are no changes to the setup or state of the curing equipment 40. It is readily apparent that this optimization greatly reduces the after cure result VRH1.

Figure 5:
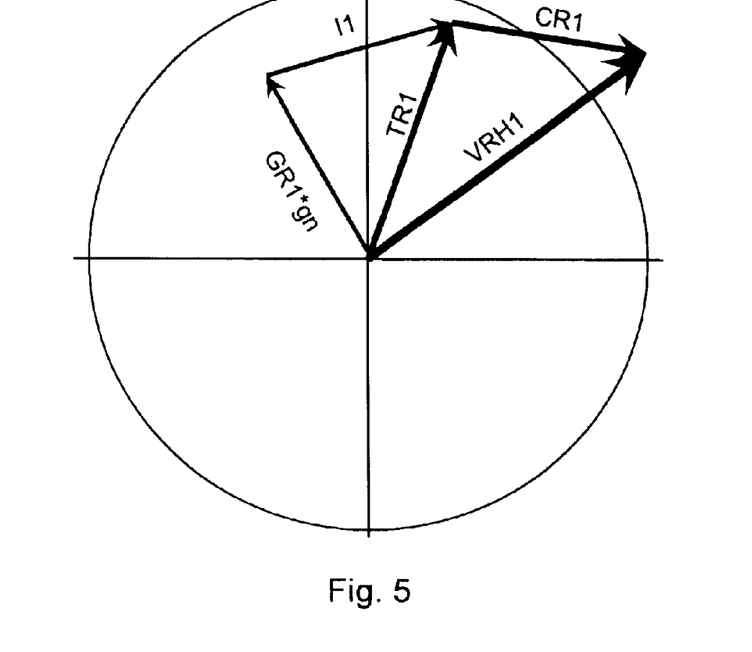
FIG. 5 is a vector polar plot of the method of the invention showing the contribution of green tire radial runout to the tire room effect vector.

The foregoing is a greatly simplified view of the factors affecting after cure uniformity. Both the tire room and curing room component vectors are the result of many individual factors, or sub-vectors. Each sub-vector is a contribution to the cured tire RFV and these vectors have units that correspond to radial force variation, i.e. kilograms. FIG. 5 demonstrates one such sub-vector, the effect of green tire radial runout indicated as Green RRO*gain. This sub-vector represents the vector product of the Green RRO (mm) and a gain vector that models the localized radial stiffness (Kg/ mm). However, the gain vector is not a simple scalar factor as used in previous methods, but is a true vector that accounts for circumferential radial stiffness variation around the green tire 30. The remaining, unidentified factors are consolidated in the Intercept vector 11. If all factors were known, then the Intercept vector 11 would not exist. Throughout this disclosure, the Intercept vector 11 accounts for the unidentified effects. Thus, the tire room effect vector, TR1, will always be the vector sum of the specific sub-vectors and the Intercept vector 11.

Figure 6:
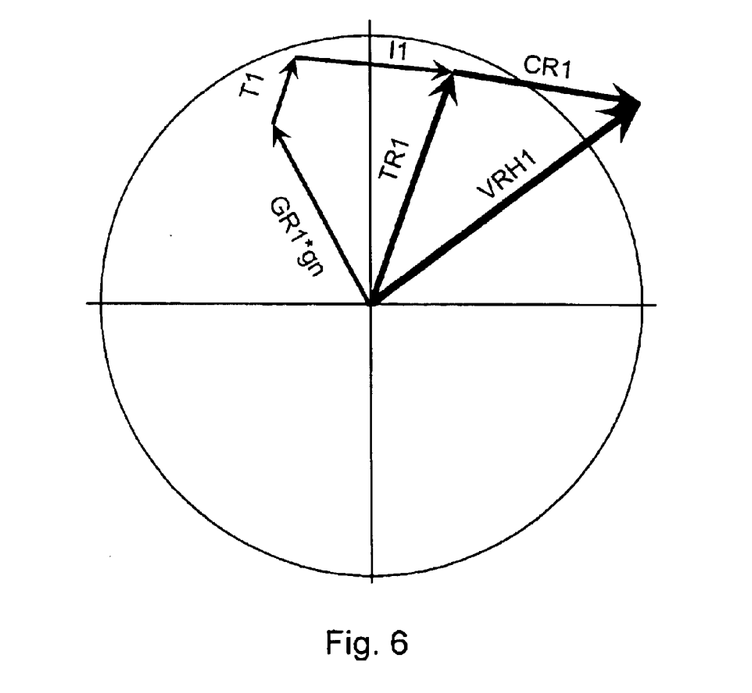
FIG. 6 is a vector polar plot of the method of the invention showing the effect on the green tire vector of the measurement drum used to measure green radial runout.
Figure 7:
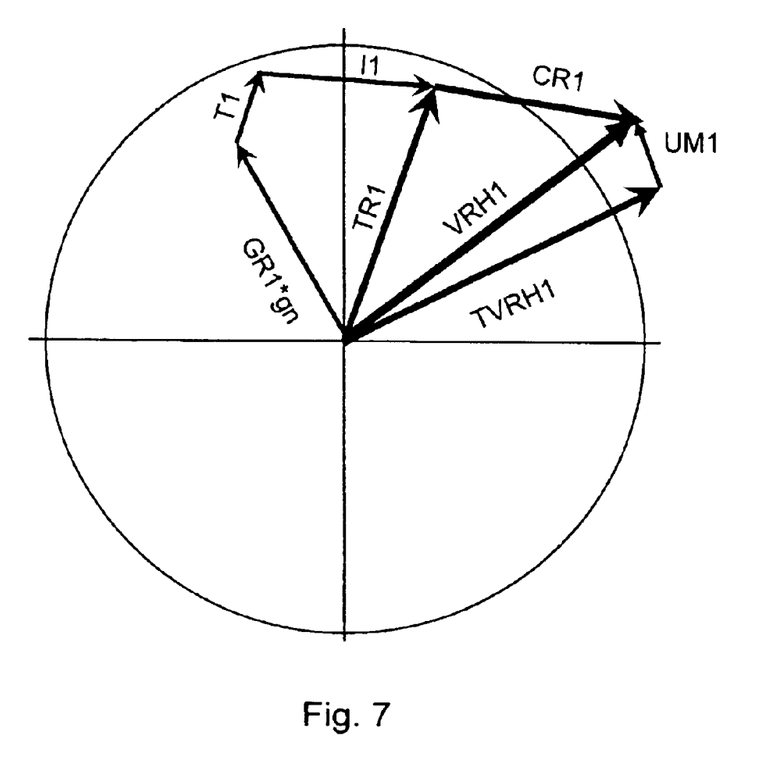
FIG. 7 is a vector polar plot of the method of the invention adding the effect of the after cure uniformity measurement machine.

FIG. 6 further declinates the tire room sub-vectors. The measurement of green tire RRO is preferably at the completion of tire building and before the green tire is removed from the building drum 15. In the preferred method, the measurement drum is the tire building drum 15 or whether it is the single drum of a unistage machine or the finishing drum of a two-stage machine. The green tire RRO measurement may also be performed offline in a dedicated measurement apparatus. In either case, the radial runout of the measurement drum can introduce a false contribution to the Green RRO vector. When the green tire RRO is measured, the result is the sum of true tire runout and the runout of the drum used for measurement of RRO. However, only the green tire RRO has an affect on the after cure RFV of the tire. As shown in FIG. 6, the method of the invention includes a measurement drum sub-vector T1 to account for this false RRO effect.

The sub-vector advantage can also be use to improve the curing room effects. An effect similar to the foregoing false RRO exists for measurement of after cure RFV. That is, the measurement machine itself introduces a contribution to the as-measured tire RFV. FIG. 8 depicts an additional sub-vector UM1 to account for this effect showing the difference between the measured radial force vector VRH1 and the true radial force vector TVRH1. This sub-vector imparts a small, but significant correction to the rotation angle CAV_REF shown in FIG. 4 for optimizing VRH1. Studies have shown that the inclusion of the UM1 sub-vector can improve the magnitude VRM1 of the true radial force vector VRH1 by about 0.5 to 1.0 Kg.

The foregoing graphical representations in vector space can now be recast as equation (1) below where each term represents the vectors and sub-vectors shown in the example of FIG. 6. The method can be applied to additional effects not depicted in FIG. 6 nor described explicitly herein without departing from the scope of the invention.

$$VRH1 = \text{Tire Room } RH1 + \text{Curing Room } RH1 \quad (1)$$

Substituting the sub-vectors for the tire room yields the final modeling equation:

$$VRH1 = (\text{Green RRO}*\text{gain} + \text{Building Drum} + \text{Intercept}) + \text{Curing Room } RH1 \quad (2)$$

or $$VRH1 = GR1*gn + T1 + I1 + CR1 \quad (3)$$

The first step in implementation of the method is to gather data to build the modeling equation. The Green RRO and VRH1 vectors are measured quantities. The challenge is to estimate the gain vector gn, the building drum vector T1, the intercept vector 11, and the curing room effect vector CR1. This is accomplished by vector rotation and regression analysis.

First, a reference point on the tire, such as a barcode applied to the carcass or a product joint that will be accessible through then entire process is identified. In the specific example described herein, the invention contains an improvement to account for the radial runout of the measurement drum itself. This effect may be significant when the tire building drum 15 is used as the measurement drum. The loading angle BD_REF of the tire carcass on the measurement drum is recorded. For this specific example, the loading angle is measured as the carcass 10 is loaded on either the first stage of a unistage or a second stage of a two-stage machine. It is advantageous to ensure a wide variation of the loading angle BD_REF within a given sample of tires to ensure accurate estimation of the effect of the measurement drum runout on the vector coefficients.

Next, the RRO of the finished, green tire 30 is measured by a measurement device 70 while the tire is mounted on the finishing stage building drum 15. Alternatively, the finished, green tire may be moved to separate measurement apparatus and the RRO measurement made there. This RRO measurement is repeated for multiple tires to randomize the effects that are not modeled. There are many known devices 70 to obtain the RRO measurement such as a non-contact system using a vision system or a laser. It has been found that systems for measurement of radial runout that are based on tangential imaging are preferred to those using radial imaging. The RRO data thus acquired are recorded in a computer 80.

Next, each green tire 30 is transferred to the curing room and the identification of the curing cavity 40 where each green tire is to be cured or vulcanized is recorded as well as the orientation azimuth CAV_REF at which each green tire is loaded into the curing cavity. It is advantageous to ensure a wide variation of the orientation azimuth within a given sample of tires to ensure accurate estimation of the curing cavity effect on the vector coefficients. After each tire has been cured, the cured tire 30' is moved to the uniformity measurement machine 50 to acquire the radial force variation RFV for each tire. The RFV data thus acquired are also recorded in a computer 80.

If the model is extended to include a uniformity machine sub-vector UM1, then similar steps to those outlined above for the building drum vector are applied at the uniformity measurement machine. A loading angle for the cured tire on the uniformity measurement machine UM_REF, similar to the carcass loading angle BD_REF, is recorded and stored in the computer 80 with the associated RFV data for a sample of tires. The sub-vector UM1 can then be added to the model using the same vector analysis procedure as described herein to obtain the building drum sub-vector T1. The model will contain an additional pair of coefficients to obtain a magnitude UMM1 and an azimuth UMA1 of the sub-vector UM1 to improve the estimation of after cure RFV.

Once these data have been acquired for a suitable sample of tires, the harmonic data are extracted from the RRO and RFV waveforms. In the present example the first harmonic data of the green radial runout GR1 (magnitude FRM1 and azimuth FRA1) and radial force variation VRH1 (magnitude VRM1 and azimuth VRA1), respectively are extracted and stored. Each vector in equation (2) above has a magnitude and an azimuth as previously defined. The following table indicates the specific terminology.

| Vector | Magnitude | Azimuth |
|---|---|---|
| Radial Force (VRH1) | VRM1 | VRA1 |
| Green RRO (GR1) | FRM1 | FRA1 |
| Gain (gn) | g | θ |
| Building Drum (T1) | TM1 | TA1 |
| Intercept (I1) | IM1 | IA1 |

-continued

| Vector | Magnitude | Azimuth |
|---|---|---|
| Tire Room Effect (TR1) | TRM1 | TRA1 |
| Curing Room Effect (CR1) | CMI | CA1 |
| Building Drum Loading Angle | — | BD_REF |
| Curing Cavity Loading Angle | — | CAV_REF |

Note that the BD_REF and CAV_REF are scalar quantities for the two reference angles that are recorded during the tire manufacturing steps.

To facilitate rapid application of equation (3) in a manufacturing environment, it is advantageous to use a digital computer to solve the equation. This requires converting the vector equations above to a set of arithmetic equations in Cartesian coordinates. In Cartesian coordinates, each vector or sub-vector has an x-component and a y-component as shown in the example below:

$$VRH1_x = (VRM1)*\COS(VRA1), \text{ and } VRH1_y = (VRM1)*\SIN(VRA1) \quad (4)$$

where the parentheses indicate the scalar values of magnitude and azimuth of the quantity within. In like manner the independent factors are converted from polar to Cartesian coordinates:

$$GR1_X = FRM1 \cdot \COS(FRA1)$$

$$GR1_Y = FRM1 \cdot \SIN(FRA1) \quad (5)$$

$$CAV\_REF_X = \COS(CAV\_REF) $$

$$CAV\_REF_Y = \SIN(CAV\_REF) \quad (6)$$

$$BD\_REF_X = \COS(BD\_REF)$$

$$BD\_REF_{Y=SIN}(BD\_REF) \quad (7)$$

$$I1_X = IM1 \cdot \COS(IA1)$$

$$I1_Y = IM1 \cdot \SIN(IA1) \quad (8)$$

The dependent vector (VRH1$_X$, VRH1$_Y$) is sum of the vectors in the equations below.

$$VRH1_x = g \cdot FRM1 \cdot \COS(\theta + FRA1) + \quad (9)$$
$$CM1 \cdot \COS(CA1 + CAV\_REF) +$$
$$TM1 \cdot \COS(TA1 + BD\_REF) +$$
$$IM1 \cdot \COS(IA1)$$

$$VRH1_y = g \cdot FRM1 \cdot \SIN(\theta + FRA1) + \quad (10)$$
$$CM1 \cdot \SIN(CA1 + CAV\_REF) +$$
$$TM1 \cdot \SIN(TA1 + BD\_REF) +$$
$$IM1 \cdot \SIN(IA1)$$

Expanding these equations with standard trigonometric identities yields:

$$VRH1_x = g \cdot \COS(\theta) \cdot FRM1 \cdot \COS(FRA1) -$$
$$g \cdot \SIN(\theta) \cdot FRM1 \cdot \SIN(FRA1) +$$
$$CM1 \cdot \COS(CA1) \cdot \COS(CAV\_REF) -$$
$$CM1 \cdot \SIN(CA1) \cdot \SIN(CAV\_REF) +$$
$$TM1 \cdot \COS(TA1) \cdot \COS(BD\_REF) -$$
$$TM1 \cdot \SIN(TA1) \cdot \SIN(BD\_REF) + IM1 \cdot \COS(IA1)$$

$$VRH1_y = g \cdot \COS(\theta) \cdot FRM1 \cdot \SIN(FRA1) +$$
$$g \cdot \SIN(\theta) \cdot FRM1 \cdot \COS(FRA1) +$$
$$CM1 \cdot \COS(CA1) \cdot \SIN(CAV\_REF) +$$
$$CM1 \cdot \SIN(CA1) \cdot \COS(CAV\_REF) +$$
$$TM1 \cdot \COS(TA1) \cdot \SIN(BD\_REF) +$$
$$TM1 \cdot \SIN(TA1) \cdot \COS(BD\_REF) + IM1 \cdot \COS(IA1)$$

To simplify the expanded equation, introduce the following identities:

$$a = g \cdot \COS(\theta), b = g \cdot \SIN(\theta) \quad (11)$$

$$c = CM1 \cdot \COS(CA1), d = CM1 \cdot \SIN(CA1) \quad (12)$$

Substituting these identities into the expanded form of equations (9) and (10) yields:

$$VRH1_X = a \cdot GR1_X - b \cdot GR1_Y + \quad (13)$$
$$c \cdot CAV\_REF_X - d \cdot CAV\_REF_Y +$$
$$e \cdot BD\_REF_X - f \cdot BD\_REF_Y + I1_X$$

$$VRH1_Y = a \cdot GR1_Y + b \cdot GR1_X + \quad (14)$$
$$c \cdot CAV\_REF_Y + d \cdot CAV\_REF_X +$$
$$e \cdot BD\_REF_Y + f \cdot BD\_REF_X + I1_Y$$

The equations (13) and (14) immediately above can be written in matrix format:

$$\begin{vmatrix} VRH1_X \\ VRH1_Y \end{vmatrix} = \begin{vmatrix} GR1_X & -GR1_Y & CAV\_REF_X & -CAV\_REF_Y & BD\_REF_X & -BD\_REF_Y & 1 & 0 \\ GR1_Y & GR1_X & CAV\_REF_Y & CAV\_REF_X & BD\_REF_Y & BD\_REF_X & 0 & 1 \end{vmatrix} \times \begin{vmatrix} a \\ b \\ c \\ d \\ e \\ f \\ I_X \\ I_Y \end{vmatrix} \quad (15)$$

When the predictive coefficients vectors (a,b), (c,d), (e,f), and ($I1_x$,$I1_y$) are known, the equation (15) above provides a modeling equation by which the VRH1 vector for an individual tire may be estimated. This basic formulation can also be modified to include other process elements and to account for different production organization schemes. These coefficient vectors may be obtained by various known mathematical methods to solve the matrix equation above.

In a manufacturing environment and to facilitate real-time use and updating of the coefficients, the method is more easily implemented if the coefficients are determined simultaneously by a least-squares regression estimate. All coefficients for all building drums and cavities may be solved for in a single regression step. Finally the vector coefficients are stored in a database for future use. For the example of a single mold and single curing cavity, the coefficients have a physical significance as follows: (a,b) is the gain vector gn in units of kgf/mm, (c,d) is the curing room effect vector CR1 in units of kgf, (e,f) is the building drum vector T1 in units of kgf, and ($I_x$, $I_y$) is the Intercept vector I1 in units of kgf.

The equations listed above are for one curing cavity and one building drum. The curing cavity and building drum are nested factors meaning that although the actual process contains many building drums and many cavities, each tire will see only one of each. Thus the complete equation may include a vector for each building drum and each curing cavity as shown below. To expand the model first requires the creation of the following matrices $V_{ij}$, $C_{ij}$, and $X_{ij}$, where the subscript "i" denotes mold i and the where the subscript "j" denotes building machine drum j, the subscript pair "i,j" denotes a tire manufactured on building drum "j" and cured in curing cavity "i":

$$V_{i,j} = \begin{vmatrix} VRM1_x \\ VRM1_y \end{vmatrix} \quad C_{i,j} = \begin{vmatrix} a \\ b \\ c \\ d \\ e \\ f \\ I_x \\ I_y \end{vmatrix}$$

$$X_{i,j} = \begin{vmatrix} FRM1_x & -FRM1_y & CAV\_REF_x & -CAV\_REF_y & BD\_REF_x & BD\_REF_y & 1 & 0 \\ FRM1_y & FRM1_x & CAV\_REF_y & CAV\_REF_x & BD\_REF_y & BD\_REF_x & 0 & 1 \end{vmatrix}$$

Then the equations above can be expressed in the succinct matrix form below for a given combination of mold and building machine drum (indexed by i and j):

$$V_{i,j} = X_{i,j} \times C_{i,j} \quad (16)$$

This equation can be expanded to accommodate multiple molds and multiple building machine drums simultaneously in matrix formula below:

$$\begin{Vmatrix} V_{1,1} \\ V_{1,2} \\ \cdot \\ \cdot \\ V_{1,m} \\ V_{2,1} \\ \cdot \\ \cdot \\ V_{n,m} \end{Vmatrix} = \begin{Vmatrix} X_{1,1} & 0 & .. & 0 & 0 & .. & 0 \\ 0 & X_{1,2} & .. & 0 & 0 & .. & 0 \\ \cdot & \cdot & & \cdot & \cdot & & \cdot \\ \cdot & \cdot & & \cdot & \cdot & & \cdot \\ 0 & 0 & .. & X_{1,m} & 0 & .. & 0 \\ 0 & 0 & .. & 0 & X_{2,1} & .. & 0 \\ \cdot & \cdot & & \cdot & \cdot & & \cdot \\ \cdot & \cdot & & \cdot & \cdot & & \cdot \\ 0 & 0 & .. & 0 & 0 & 0 & X_{n,m} \end{Vmatrix} \times \begin{Vmatrix} C_{1,1} \\ C_{1,2} \\ \cdot \\ \cdot \\ C_{1,m} \\ C_{2,1} \\ \cdot \\ \cdot \\ C_{n,m} \end{Vmatrix} \quad (18)$$

The final step is to apply the model to optimize the RFV of individual tires as they are manufactured according to the illustration shown in FIG. 4. Each tire building drum carriers an identification "j" and each curing cavity an identification "i." Each tire carries a unique identification device, such as a barcode. These identification tags allow the information recorded for an individual tire may be retrieved at a later step. At the completion of tire building, the green RRO is measured and its harmonic magnitude FRM1 and azimuth FRA1 are recorded along with the loading angle BD_REF of the tire on the building or measurement drum. When the green tire arrives in curing room, the curing cavity in which it will be cured will be predetermined and the curing room effect vector information for that cavity may be retrieved from the database. A reading device scans the unique barcode to identify the tire, to facilitate polling the database to find the measured and recorded tire information: FRM1 and FRA1, the building drum identification, and the loading angle BD_REF. Next, a calculation is performed to estimate the tire room effect vector by the equations below. Note that equations (17) and (18) are identical in form to equations (9) and (10) above, but now are being used in a predictive fashion to estimate the tire room contribution to cured RFV.

$$TR1_x = a \cdot GR1_x - b \cdot GR1_y + e \cdot BD\_REF_x - f \cdot BD\_REF_y + \quad (19)$$
$$e \cdot BD\_REF_X - f \cdot BD\_REF_Y +$$
$$I_x$$

$$TR1_y = a \cdot GR1_y - b \cdot GR1_x + e \cdot BD\_REF_y - f \cdot BD\_REF_x + \quad (20)$$
$$e \cdot BD\_REF_Y + f \cdot BD\_REF_X +$$
$$I_y$$

The azimuth TRA1 of the tire room effect vector TR1 is the inverse tangent of the quantity ($TR1_y$/$TR1_x$), and the azimuth CA1 of the curing room effect vector CA1 is the inverse tangent of the quantity (d/c). Again referring to FIG. 4, the green tire 30 is rotated so that its orientation angle CA1_REF relative to the curing cavity 40 is such that azimuth TRA1 of the predicted tire room effect vector is opposed to the azimuth CA1 of the curing room effect vector. This operation may be expressed in the equation below:

$$CAV\_REF = 180 + TRA1 - CA1 \quad (21)$$

The green tire 30 is then loaded into the curing cavity 40 at the orientation angle CAV_REF that minimizes RFV in the cured tire 30'.

When the above method is practiced with multiple tire building drums and multiple curing cavities, then all steps of the method, determining the vector coefficients, estimating the after cure RFV, and optimizing the after cure uniformity, are carried out using the specific identifiers of the process equipment. In this manner, a tire produced on any building machine can be cured in a curing cavity with an optimized level of RFV.

In the case where the tire does not have a unique identifying barcode, it is not possible to perform the entire optimization process at the curing room. In this case, the tire must be marked to indicate the azimuth TRA1 of the tire room effect vector TR1 while the tire is at the tire building machine. The azimuth of the tire room effect vector of the green tire is calculated using the vector-regression method, and a mark is placed on the tire corresponding to the azimuth angle TRA1. In addition, the curing cavity 40 has been previously marked at an azimuth (CA1-180) diametrically opposed to the curing room effect vector CA1. When the green tire 30 is transferred to the curing room and arrives at the curing cavity 40, the pre-applied mark on the tire 30 indicating the azimuth TRA1 is aligned with the pre-applied mark on the curing cavity 40. In this manner, the tire room effect vector TR1 and the curing room effect vector oppose each other and the after cure VRH1 will be optimized.

Another advantageous and unique feature of the invention is the ability to update the predictive coefficients vectors (a,b), (c,d), (e,f), and ($I_X$,$I_Y$) with the data measured from each individual tire to account for the constant variations associated with a complex manufacturing process. Because the green RRO and cured RFV of individual tires are continuously measured, the model may be updated at periodic intervals with these new production data so as to adjust the predictive equations for changes in the process. These updates may be appended to the existing data or used to calculate a new, independent set of predictive coefficient vectors which may replace the original data.

It should be understood that the present invention includes various modifications that can be made to the tire manufacturing method described herein as come within the scope of the appended claims and their equivalents.

What is claimed is:

1. A method for improving the uniformity of a tire comprising the steps of:
   (a) Determining a set of vector coefficients corresponding to the after cure radial force variation of a tire, comprising the sub-steps of:
      (i) Recording a loading angle of a tire carcass on a measurement fixture,
      (ii) Measuring the before cure radial runout of a plurality of finished tires,
      (iii) Recording a loading angle of said finished tires in a curing mold and curing said tires,
      (iv) Measuring the after cure radial force variation for each of said tires,
      (v) Extracting at least one harmonic of the radial runout and of the radial force variation of said tires,
      (vi) Determining a set of vector coefficients relating the before cure radial runout to the after cure radial force variation of said tires cured in said mold,
      (vii) Storing said vector coefficients,
   (b) Estimating the after cure uniformity of an individual tire comprising the sub-steps of:
      (i) Recording a loading angle of a carcass of said individual tire on said measurement fixture
      (ii) Measuring the before cure radial runout of said individual tire,
      (iii) Choosing a harmonic of radial force variation to be optimized,
      (iv) Extracting a harmonic of radial runout of said individual tire,
      (v) Estimating a tire room effect vector of the radial force variation corresponding to said harmonic,
      (vi) Estimating a curing room effect vector of the radial force variation corresponding to said harmonic,
   (c) Optimizing the after cure uniformity of an individual tire comprising the sub-steps of:
      (i) Determining an azimuth of said tire room effect vector and of said curing room effect vector,
      (ii) Aligning the angular position of said individual tire such that said azimuth of said tire room effect vector opposes said curing room effect vector, and
      (iii) Placing said individual tire so aligned in said curing mold and curing said tire.

2. The method for improving the uniformity of a tire according to claim 1, wherein said measurement fixture is a tire building drum.

3. The method for improving the uniformity of a tire according to claim 1, wherein said measurement fixture comprises a tangential imaging means.

4. The method for improving the uniformity of a tire according to claim 1 wherein a pair of said vector coefficients corresponds to a building drum vector.

5. The method for improving the uniformity of a tire according to claim 1, wherein a pair of said vector coefficients corresponds to a tire gain vector.

6. The method for improving the uniformity of a tire according to claim 1 wherein a pair of said vector coefficients corresponds to an intercept vector.

7. The method for improving the uniformity of a tire according to claim 1 wherein a pair of said vector coefficients corresponds to said curing room effect vector.

8. The method for improving the uniformity of a tire according to claim 1 wherein said tire room effect vector comprises the vector sum of a before cure tire effect vector, a building drum vector, and an intercept vector.

9. The method for improving the uniformity of a tire according to claim 1 wherein a before cure tire effect vector comprises a vector product of a tire gain vector and a green tire radial runout vector of said harmonic.

10. The method for improving the uniformity of a tire according to claim 1, wherein the sub-steps of determining said vector coefficients are performed in a simultaneous step.

11. The method for improving the uniformity of a tire according to claim 10, wherein said simultaneous step comprises a multivariate least-squares regression.

12. The method for improving the uniformity of a tire according to claim 1, further comprising the steps of recording an identifier for a specific building drum and for a specific curing cavity.

13. The method for improving the uniformity of a tire according to claim 12, wherein each of said steps of determining a set of vector coefficients, estimating the after cure uniformity, and optimizing the after cure uniformity comprises a multivariate least-squares regression of a set of matrix equations corresponding to multiple building drums and multiple curing cavities.

14. The method for improving the uniformity of a tire according to claim 1, wherein the step of determining a set of vector coefficients further comprises the sub-step of recording a loading angle of a cured tire on a uniformity measurement machine.

15. The method for improving the uniformity of a tire according to claim 1, wherein a pair of said vector coefficients corresponds to a uniformity machine vector.

16. The method for improving the uniformity of a tire according to claim 1, wherein the step of determining a set of vector coefficients is repeatedly updated using data from said individual tire.

17. The method for improving the uniformity of a tire according to claim 1, wherein said step of determining a set of vector coefficients and said step of optimizing the after cure uniformity are carried out using the first through fifth harmonics.

* * * * *